United States Patent
Yalagandula et al.

(10) Patent No.: US 7,965,655 B2
(45) Date of Patent: Jun. 21, 2011

(54) DISTRIBUTED NETWORK DISTANCE DETERMINATION USING A DISTRIBUTED HASH TABLE OVERLAY NETWORK

(75) Inventors: Praveen Yalagandula, Redwood City, CA (US); Puneet Sharma, Menlo Park, CA (US); Sujata Banerjee, Sunnyvale, CA (US); Sung-Ju Lee, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 930 days.

(21) Appl. No.: 11/700,579

(22) Filed: Jan. 31, 2007

(65) Prior Publication Data

US 2008/0181135 A1 Jul. 31, 2008

(51) Int. Cl.
*G08C 15/00* (2006.01)
(52) U.S. Cl. ........ 370/255; 370/252; 370/256; 370/539; 725/86
(58) Field of Classification Search .................. 370/252, 370/254, 256, 229, 539; 455/452.1; 709/201; 725/86
See application file for complete search history.

(56) References Cited

U.S. PATENT DOCUMENTS

| | | | |
|---|---|---|---|
| 7,812,718 B1* | 10/2010 | Chan et al. | 340/539.13 |
| 2005/0007964 A1* | 1/2005 | Falco et al. | 370/256 |
| 2005/0030904 A1* | 2/2005 | Oom Temudo de Castro et al. | 370/252 |
| 2005/0288031 A1* | 12/2005 | Davis et al. | 455/452.1 |
| 2006/0120411 A1* | 6/2006 | Basu et al. | 370/539 |
| 2006/0149806 A1* | 7/2006 | Scott et al. | 709/201 |
| 2008/0072264 A1* | 3/2008 | Crayford | 725/86 |
| 2009/0016241 A1* | 1/2009 | O'Neal et al. | 370/256 |

* cited by examiner

*Primary Examiner* — Robert W Wilson
*Assistant Examiner* — Mohamed Kamara (57) ABSTRACT

Distances are determined between an identified node and landmark nodes and milestone nodes in a network. The closest milestone or landmark node associated with a shortest of the measured distances is determined. A corresponding distributed hash table (DHT) overlay node is queried for distances between observed nearest nodes for the closest milestone or landmark node and the identified node. Distances between the identified node and the observed nearest nodes are calculated from distances received from the DHT overlay node and the measured distance to the closest milestone or landmark node. K-closest nodes from the identified node are selected from at least one of the closest milestone or landmark node and one or more of the observed nearest nodes based on the calculated distances.

25 Claims, 9 Drawing Sheets

DISTRIBUTED NETWORK DISTANCE DETERMINATION USING A DISTRIBUTED HASH TABLE OVERLAY NETWORK

BACKGROUND

The Internet, as it has grown considerably in size and popularity, is being used to provide various services and applications to users. Diverse applications, such as streaming a short movie demonstrating how to assemble a piece of furniture, taking a virtual tour of a real estate property or a scenic spot, watching a live performance of an artist, and participating in a networked multi-user computer game or conference, are all available to users via the Internet.

An important trend is that users are no longer satisfied with receiving services that are targeted at mass audiences. Users are demanding services that are tailored to their individual needs. With the proliferation of personalized services, an important challenge facing future network infrastructure is balancing the tradeoffs between providing individualized services to each user and making efficient use of network resources.

A fundamental challenge in effectively utilizing network resources and services is efficiently and quickly locating desired data or services in large networks, such as the Internet. A centralized service may be used to find the closest cache or proxy in the network that provides the desired data or service, such as the desired media content. For example, all users may send queries to the central service to find a closest server.

A centralized database with information about all the service nodes has the advantage of storing complete information, and the answers returned, such as an answer to the question of which node providing a desired service is closest, can be easily provided. However, there are some disadvantages to a centralized system, especially as the number of service nodes increases. First, the centralized database system is a single point of failure. Second, if this database is to receive periodic updated information from all of the service nodes, there is clearly a limit to the traffic that such updates can impose. In practice, this limits either the frequency of the individual updates or the number of nodes in the system, given the same amount of bandwidth. Lastly, a centralized database cannot be located at the same distance from all nodes that might issue queries, and some of these nodes may end up paying a higher latency to perform the queries due to their distance from the centralized database. Replicating the database may increase the availability and potentially decrease the average latency for querying, while still providing the same answers as the centralized system. However, replication aggravates the network traffic problem for updates.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

For simplicity and illustrative purposes, the principles of the embodiments are described. In the following detailed description, references are made to the accompanying figures, which illustrate specific embodiments. Changes may be made to the embodiments without departing from the spirit and scope of the embodiments.

According to an embodiment, a scalable and robust distributed system provides proximity estimation for nodes as a proximity estimation service. Nodes providing content or services may register with the proximity estimation service, and clients looking for content or services may use the proximity estimation service to locate a set of nearby nodes providing a desired service or content.

The proximity estimation service may include a database storing distances for nodes in the network, an identification of observed nearest nodes to a node, types of content or services provided by a node and possibly other information that may be useful for locating closest nodes. Using the database, the proximity estimation service may respond to queries, such as, "Tell me k nodes closer to A with latency less than x seconds."

For scalability and robustness, the database is partitioned across overlay nodes forming a distributed hash table (DHT) overlay network. The DHT overlay network stores distance information for the nodes. For fast retrieval of the relevant information to answer proximity queries, the distance information is stored in the DHT overlay network as described below.

A node is any device that may send and/or receive messages from another device via the network. A physical location of a node, also referred to herein as the node's location in the network, is the node's location in the network relative to other nodes in the network. Distances between nodes, closeness of nodes, observed nearest nodes and proximity of nodes are based on a network metric, such as latency (e.g., round-trip-time), network hops, bandwidth, loss rate, or another known network metric. Distance information for a node may be determined by measuring distances to other nodes in the network, such as landmark nodes and milestone nodes that are proximally located to the node.

Landmark nodes and milestone nodes may be randomly selected from the nodes in a network. Almost any node in the network may be selected to be a landmark node or a milestone node. The number of nodes selected to be milestone nodes and landmark nodes is generally much smaller than the total number of nodes in the network. The number of landmark and milestone nodes used in the network may depend on the desired accuracy of the location information. To minimize network traffic, milestone nodes may be strategically placed in the network, such as near gateway routers. For example, routers encountered by a message from the node en route to a landmark node can be used as milestone nodes.

Distance information for a node may be determined by measuring distances to landmark nodes and milestone nodes. In one embodiment, the node measures distances to each of the landmark nodes in the network and milestone nodes to determine a landmark vector for the node. The landmark vector includes distances to each landmark node and the milestone nodes. The milestone nodes that distances are measured to may not include all the milestone nodes in the network, and instead may include the milestone nodes encountered in the network path between the node and the landmark nodes.

For example, the node conducts traceroute measurements to every landmark node, discovering upstream routes from the node to the landmark nodes. Also, every landmark node conducts traceroute measurements to the node, discovering downstream routes from the landmark nodes to the node. As a result, whenever a router appears on at least one upstream and one downstream route to the node, it is considered a milestone node. Measurements to the node's milestones are included in the node's landmark vector and are stored in the DHT overlay network.

Distance information may be generated for substantially all the nodes in a network or a subset of nodes, such as the nodes providing services or content. The distance information may be used for a variety of applications. For example, the distance information may be used to identify a node for routing in the network. In another example, the distance information may be used to find a closest node providing requested content or services for a client.

Figure 1:
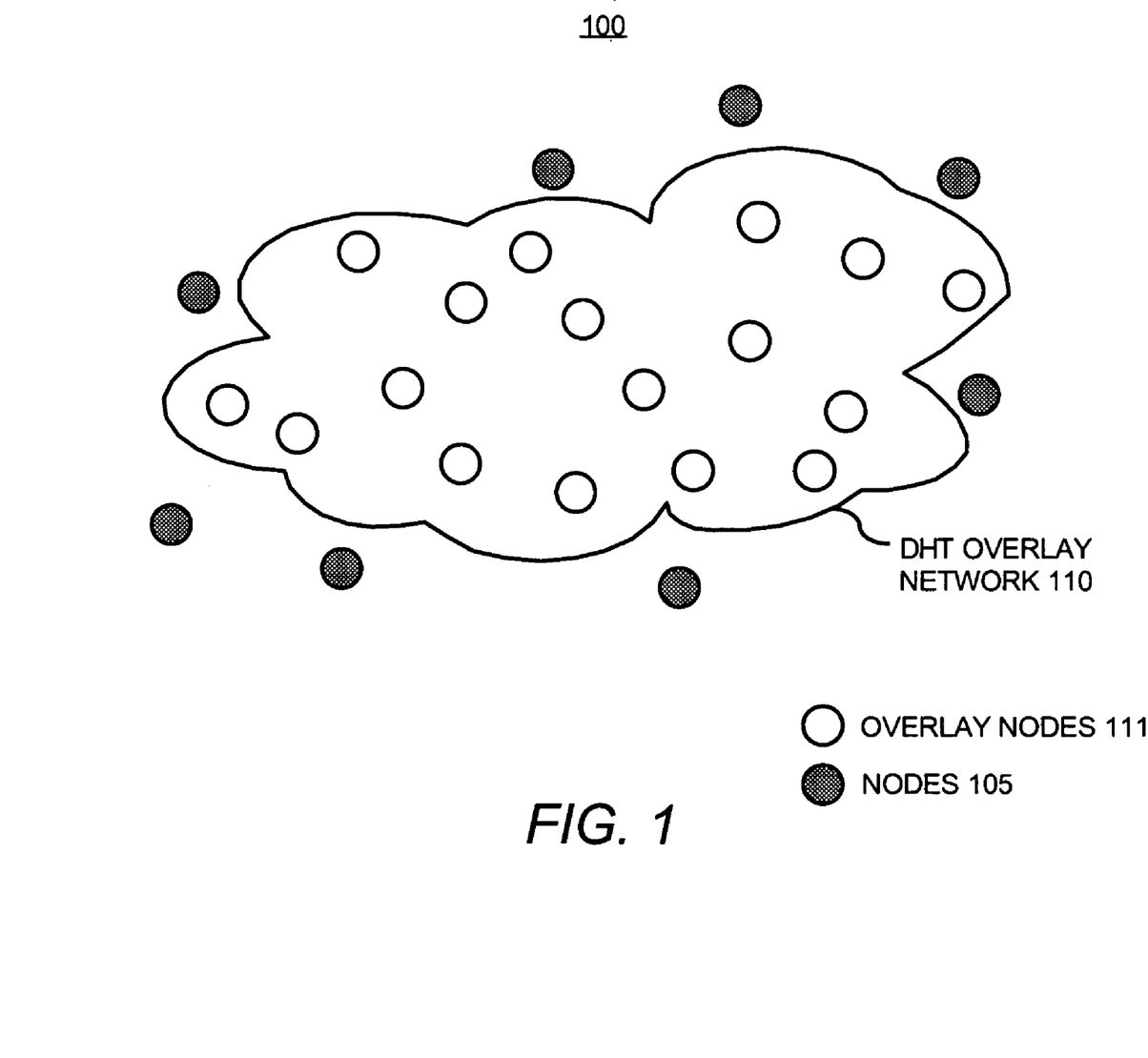
FIG. 1 illustrates nodes in a network, according to an embodiment.

FIG. 1 illustrates a system 100 including a DHT overlay network 110 for storing location information for nodes in a network, according to an embodiment. DHT overlay networks are logical representations of an underlying physical network, which provide, among other types of functionality, data placement, information retrieval, and overlay routing. DHT overlay networks have several desirable properties, such as scalability, fault-tolerance, and low management cost. Some examples of DHT overlay networks that may be used in the embodiments of the invention include content-addressable-network (CAN), PASTRY, CHORD, etc.

The DHT overlay network 110 includes DHT overlay nodes 111, referred to as overlay nodes 111. The overlay nodes 111 store distance information for the nodes 105. The nodes 105 may include clients, such as user computer systems, servers for providing services or providing data, such as media content or other types of data, or routers. A landmark node may be one of the nodes 105 or one of the overlay nodes 111. A milestone node is typically an intermediate router, and may be one of the nodes 105. The nodes 105 may also include service nodes. Service nodes are computer systems providing a service. Examples of services include different types of transcoding, language translation, etc. In some situations service nodes combine their services in a particular order, referred to as component services, to provide a final desired service for a user or application. An overlay node may also be a service node or provide content.

As described above, the overlay nodes 111 store distance information for the nodes 105, which may include distance information for service nodes, nodes providing content, or other nodes in the network. In addition to storing information, the overlay nodes 105 provide fast retrieval of the information using the DHT. The DHT overlay network 110 may also store distance information for the overlay nodes 111.

Figure 2:
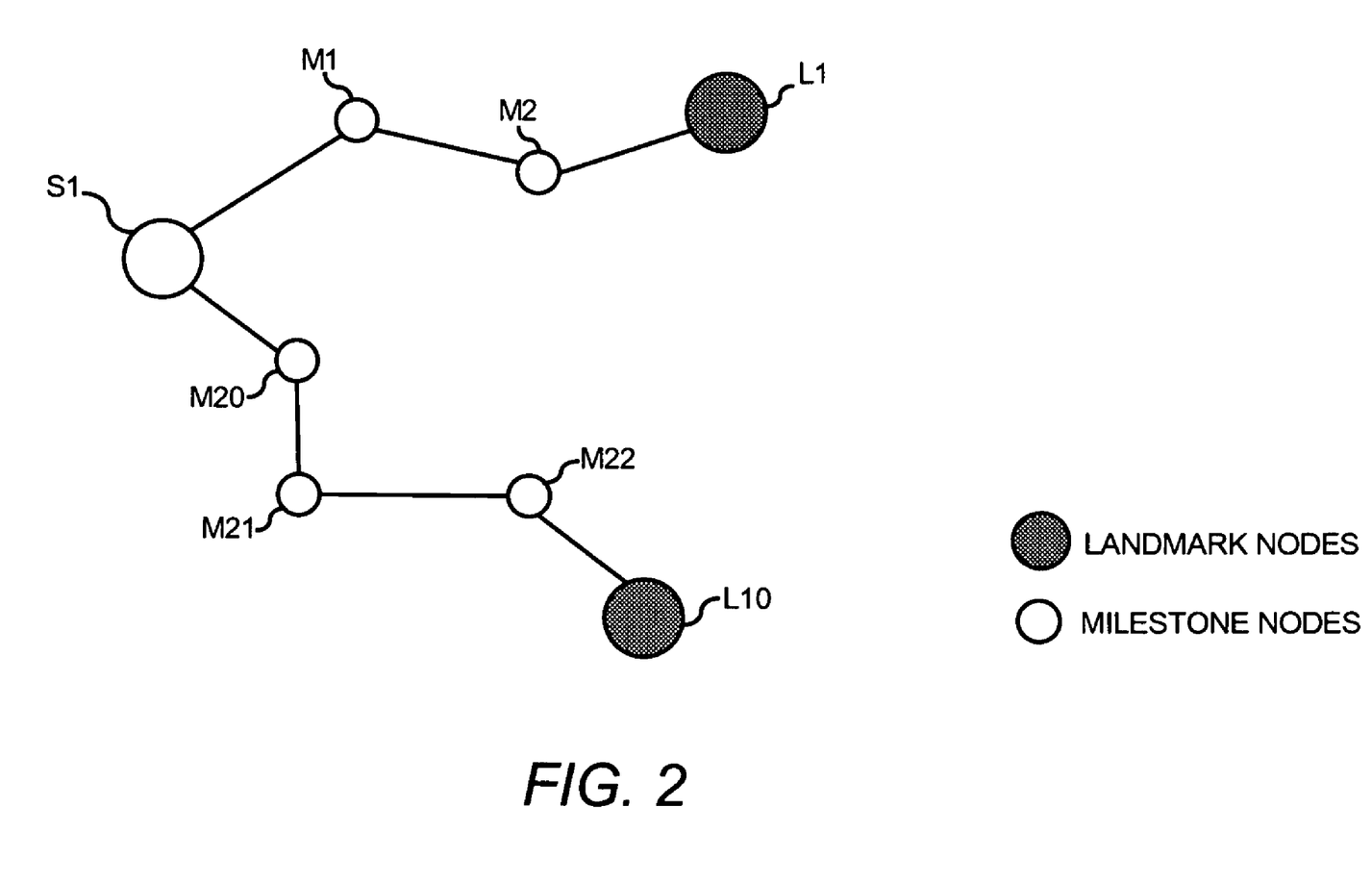
FIG. 2 illustrates landmark nodes and milestones for a service node, according to an embodiment.

FIG. 2 illustrates storing distance information for the node S1 in the DHT overlay network 110. The node S1 may be a service node in the system 100, such as one of the nodes 105. The node S1 measures distances to all the landmark nodes in the system 100. For example, the system 100 includes ten landmark nodes. FIG. 2 shows two landmark nodes L1 and L10 to illustrate storing distance information.

The node S1 measures distances to landmark nodes L1 and L10. The node S1 also measures distances to milestone nodes M1, M2, M20, M21 and M22, which are the nodes encountered in the network path to the landmark nodes L1 and L10. The landmark vector for the node S1 is as follows where "d" represents distance: [d(S1,M1), d(S1,M2), d(S1,L1), . . . d(S1,M20), d(S1,M21), d(S1,M22), d(S1,L10)].

Distances to the milestone nodes can be obtained with little or no added messaging overhead if the milestone nodes can respond to measurement traffic, such as a probe packet for measuring latency. For example, a probe packet sent to L10 from S1 to measure latency between S1 and L10 encounters milestone nodes M20-M22. The milestone nodes M20-M22 each transmit an acknowledgement (ACK) message back to S1. S1 determines distances to M20-M22 and L10, for example, using the round trip time of the probe packet and the ACK message from each of M20-M22 and L10. In one embodiment, to minimize network traffic, a probe packet may keep track of the number of milestone nodes that it has encountered, for example, by updating a field in a packet header similar to a time-to-live field. If a milestone node receives a probe packet that has already encountered a predetermined number of milestone nodes, the milestone node simply forwards the packet without transmitting an ACK message. Thus, additional distance measurement traffic to the milestone nodes need not be generated, because a probe packet being transmitted to a landmark node may also be utilized to measure distances to milestone nodes encountered en route to the landmark nodes.

Each distance is stored separately in the DHT overlay network 110. According to an embodiment, an identification (ID) for the milestone node or the landmark node is used as a key, which is the input to a predetermined hash function, to determine a value, which is the output of the hash function. The value identifies the overlay node for storing the distance. For example, an ID for M1 is hashed to identify an overlay node for storing d(S1, M1), and S1 transmits d(S1,M1) to the overlay node. The same process is repeated for all the distances in the landmark vector for S1. For example, an ID for L10 is hashed to identify an overlay node for storing d(S1, L10), and S1 transmits d(S1, L10) to the overlay node. Hence all the distances corresponding to a particular milestone node or landmark node are stored on the same overlay node. In other words, each milestone node has a corresponding overlay node storing all measured distances to/from the milestone node. Similarly, each landmark node has a corresponding overlay node storing all measured distances to/from the landmark node. The corresponding overlay node is determined by hashing a value associated with the landmark node or milestone node, whereby the value may be the node ID of the landmark node or milestone node.

Every node in the system 100 that may need to be found or may need to provide data or services for other nodes or users can perform the distance measurements to determine their landmark vectors. Each distance in the landmark vectors is stored in the DHT overlay network 110, such as described above.

Also, nodes providing services or content store an indication of the services or content provided by the node along with the distance information in the DHT. Thus, a node requesting a service or content can quickly identify the closest nodes providing the requested service or content.

Distances may be easily retrieved from the DHT by hashing an ID for a landmark node or milestone node to identify overlay nodes storing the desired distance information. Then, the overlay node may be queried for the distance information.

Figure 3:
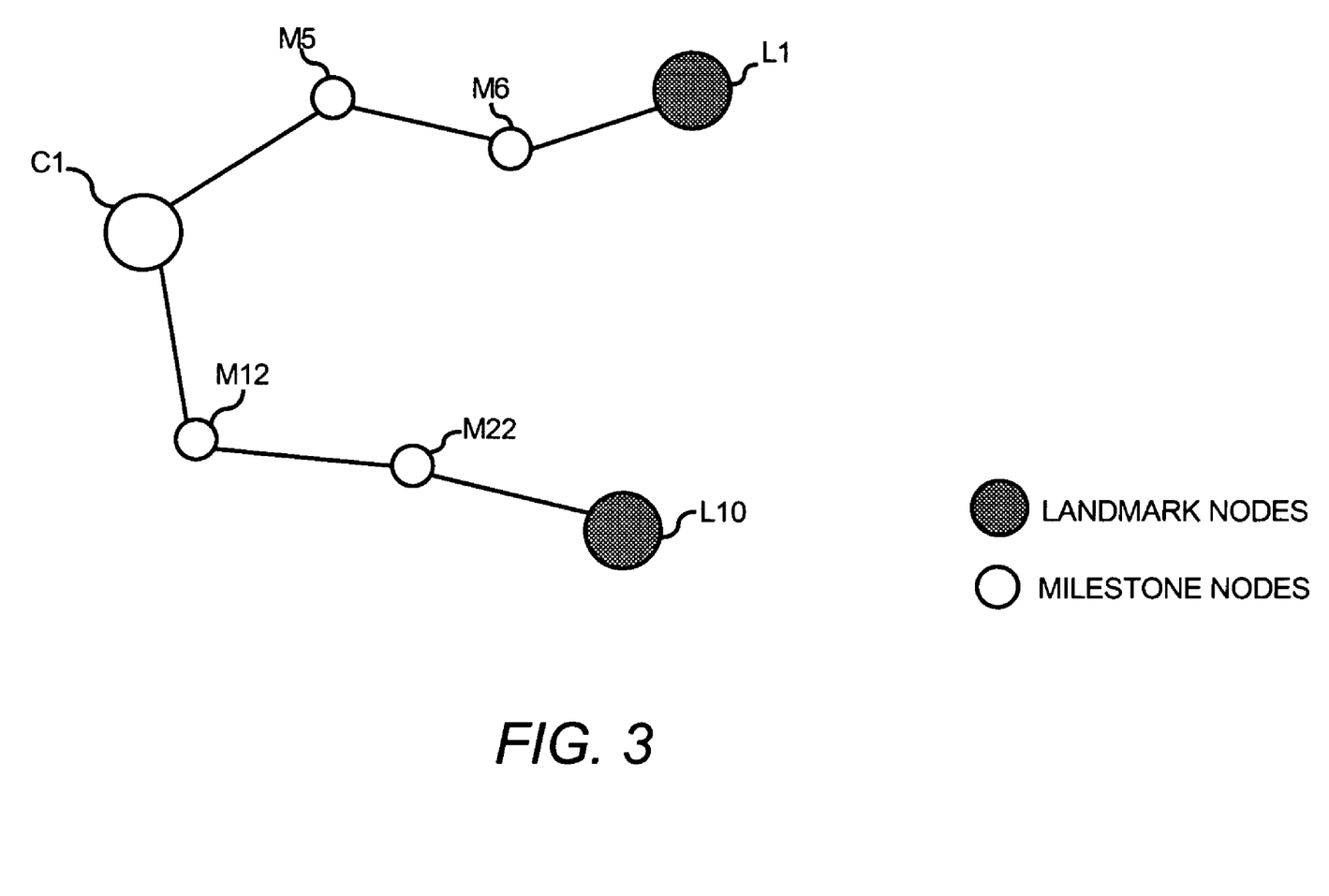
FIG. 3 illustrates landmark nodes and milestones for a client node, according to an embodiment.

Suppose a client wants to find a set of nearest nodes that are within a latency of x seconds, where distance is latency. A client is a node requesting distance information from the DHT overlay network 110. The client measures distances to all the landmark nodes and proximally located milestone nodes. For example, as shown in FIG. 3, client C1 measures distances to L1 and L10. C1 also measures distances to M5, M6, M12, and M22 because those milestone nodes are in the network path to L1 and L10. C1 determines a landmark vector, such as [d(C1,M5), d(C1,M6), d(C1,L1), ... d(C1, M12), d(C1,M22), d(C1,L10)].

The client C1 orders the distances in order from shortest distance to longest distance. The ordered landmark vector may be as follows: [d(C1,M5), d(C1,M6), d(C1,M12), d(C1, L1), ... d(C1,M22), d(C1,L10)]. Starting from the shortest distance, C1 identifies the milestone node or the landmark node to which the distance was measured and retrieves the observed nearest nodes for that node. For example, the shortest distance is to M5. C1 hashes the ID for M5 and identifies the overlay node storing distances to (and from) M5. C1 queries the identified overlay node for the observed nearest nodes to M5. Then, C1 calculates distances to each node nearest to M5. For example, one calculated distance is d(C1, M5)+d(M5 to a first observed nearest node to M5). Another calculated distance is d(C1,M5)+d(M5 to a second observed nearest node to M5), etc. This process may be repeated for each entry in the ordered landmark vector until the k-closest nodes within latency less than x seconds are found or until all the nodes in the ordered landmark vector are covered.

The observed nearest nodes may be determined by the overlay node storing the distance information. For example, an overlay node stores distance information for M5, including a measured distance between C1 and M5. The same overlay node also stores distances between M5 and other nodes, which may include service nodes or nodes providing content. That overlay node, from the distances for M5 stored therein, determines the closest nodes to M5, which are the observed nearest nodes. These distances are transmitted to C1. If C1 is requesting a service or content, then the overlay node may only send the distances for the observed nearest nodes to M5 providing the requested service or content. Thus, the DHT overlay network, in addition to storing distances, may store the service and/or content provided by each node. Then, the k-closest nodes providing a desired service or content can be found.

In another embodiment for locating nodes with near network proximity, such as finding a set of nearest nodes that are within a latency of x seconds, the client C1 identifies all the milestone nodes and landmark nodes with latency less than or equal to x seconds, and queries all the identified milestone nodes and landmark nodes at the same time for nodes within x seconds of the client C1. For example, referring to FIG. 3, C1 identifies M5 and M12 as having distances less than x seconds to C1. C1 sends a query to the DHT nodes storing distance information for M5 and M12, requesting all the nodes having latency less than x seconds. The DHT nodes storing distances to M5 and M12 respectively and also storing distance information for observed nearest nodes to M5 and M12 respectively, determine observed nearest nodes to M5 and M12 having distances to C1 less than x seconds. For example, one calculated distance is d(C1,M5)+d(M5 to a first observed nearby node to M5). If this calculated distance is less than or equal to x seconds, then the DHT node for M5 sends an ID and distance for the observed nearby node to C1. These distance calculations are also performed at the DHT node for M12, and that DHT node sends observed nearby nodes with latency less than or equal to x seconds to C1. Alternatively, the DHT nodes send the distances to the observed nearby nodes for M5 and M12 to C1, and C1 calculates the total distance to the observed nearby nodes (e.g., d(C1,M5)+d(M5 to a first observed nearby node to M5) to identify nodes having a distance to C1 of less than or equal to x seconds.

In another embodiment, the distance information stored in the DHT overlay network 110 is used to estimate distance between two nodes in the network. U.S. patent application Ser. No. 11/082,135, entitled "Distributed Storing of Network Position Information for Nodes" by Sharma et al., filed Mar. 16, 2005, describes a similar technique for estimating distance, and is incorporated by reference in its entirety.

Figure 4:
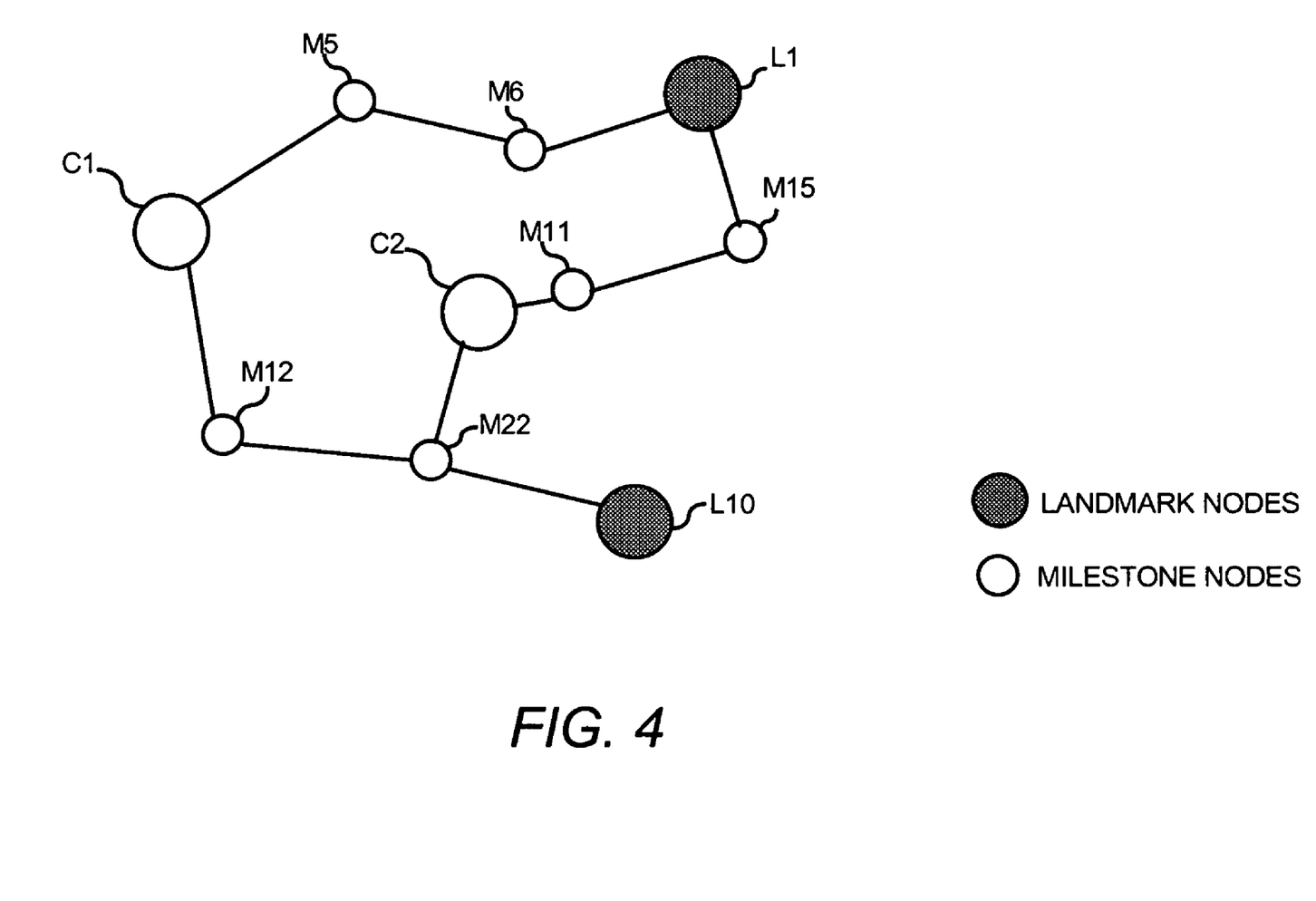
FIG. 4 illustrates landmark nodes and milestones for two client nodes, according to an embodiment.

FIG. 4 illustrates two clients C1 and C2. C1 and C2 measure distances to all landmark nodes in the network and milestone nodes to determine their landmark vectors. The landmark vector for C2 includes [d(C2,M11), d(C2,M15), d(C2, L1), ... d(C2,M22), d(C2,L10)]. The landmark vector for C1 is described above. The distances in the landmark vectors for C1 and C2 are stored in the DHT overlay network based on the corresponding milestone or landmark node as described above. Note that in addition to sharing all the landmark nodes, the landmark vectors for C1 and C2 share the milestone node M22.

C1 desires to determine its distance to C2. C1 sends a query to all the DHT nodes storing distances to the landmark nodes and milestone nodes in the landmark vector for C1. The query requests a distance between C1 and C2. Each DHT node determines whether it stores a distance to C2. All the landmark nodes store a distance to C2, and in this example, the DHT node for the milestone node M22 also stores the distance to C2. The corresponding DHT nodes for all the landmark nodes and the milestone node M22 calculate distances between C1 and C2. For example, at the DHT node for M22, distance between C1 and C2 is d(C1,M22)+d(C2,M22). Similar calculations are performed for the DHT nodes corresponding to the landmark nodes. The DHT nodes send the calculated distances to C1, and C1 selects the shortest distance as an estimation of the distance between C1 and C2. Alternatively, the DHT nodes send to C1 the distances from the corresponding landmark or milestone node to C2, and C1 calculates the distances between C1 and C2 and selects the shortest distance as an estimation of the distance between C1 and C2.

Figure 5:
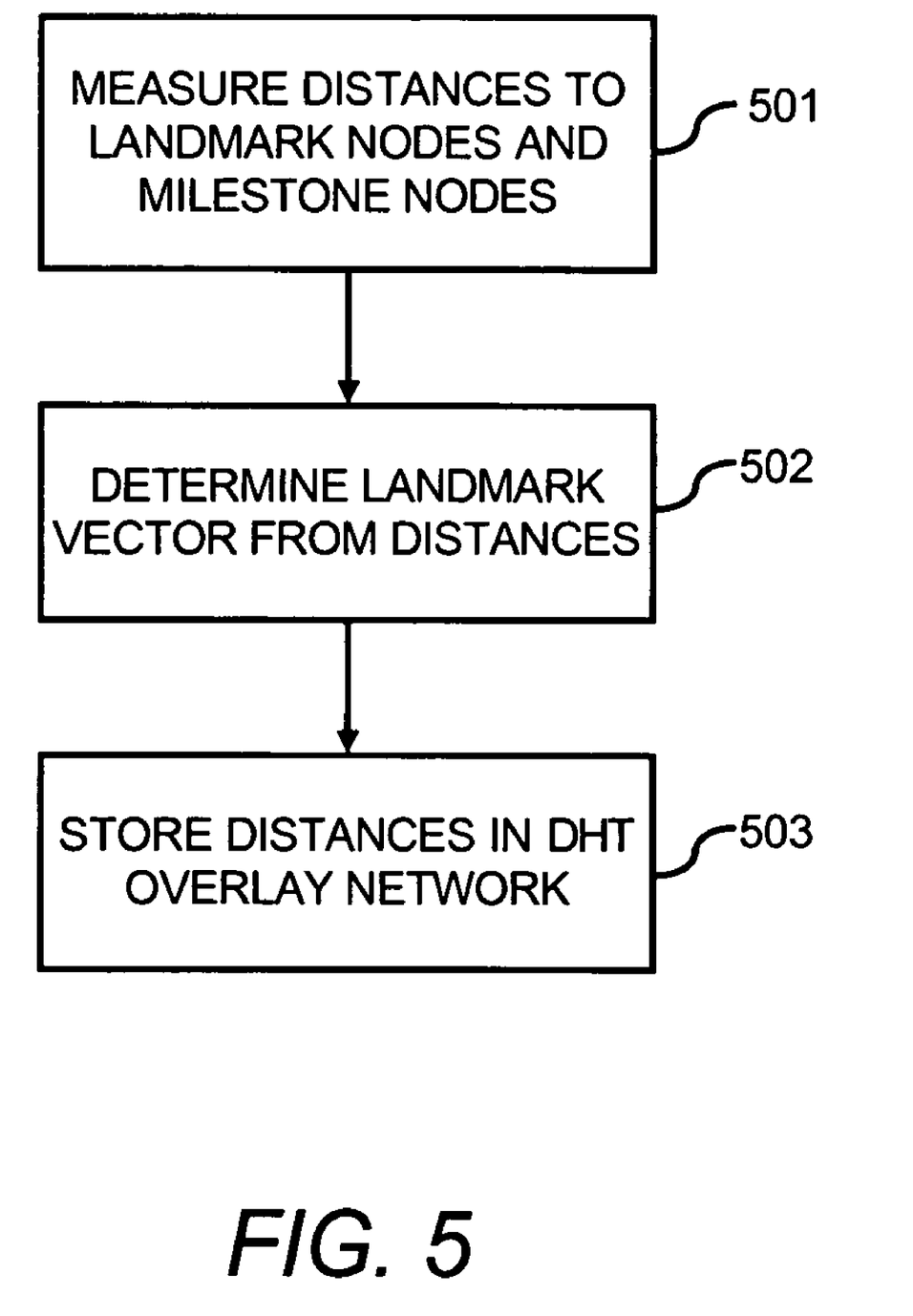
FIG. 5 illustrates a flowchart of a method for storing distance information in a DHT overlay network, according to an embodiment.

FIG. 5 illustrates a method 500, according to an embodiment, for storing distance information in a DHT overlay network. The method 500 is described with respect to FIGS. 1-3 by way of example and not limitation.

At step 501, distances are measured to or from landmark nodes and milestone nodes. This may include distance measurements to all the landmark nodes and the proximally located milestone nodes. Milestone nodes in a network path between a node and a landmark node may be proximally located. For example, as shown in FIG. 2, S1 measures distances to L1 and L10. M1, M2 and M20-M22 are in the network paths to L1 and L10 and distances are measured to M1, M2 and M20-M22.

At step 502, a landmark vector including the measured distances is determined. The landmark vector may include all the measured distances to the landmark nodes and the milestone nodes.

At step 503, the distances in the landmark vector are stored in a DHT overlay network, such as the DHT overlay network 110 shown in FIG. 1. According to an embodiment, the ID for each landmark or milestone node in the landmark vector is hashed to identify the corresponding overlay node for storing the distances. For example, the ID of the node M5 shown in FIG. 2 is hashed to identify the corresponding overlay node for storing the distance to M5. The ID for M6 is hashed to identify the corresponding overlay node for storing the distance to M5, and so on for each milestone node and landmark node in the landmark vector. Then, S1 sends the distances to the corresponding overlay nodes for storage.

Figure 6:
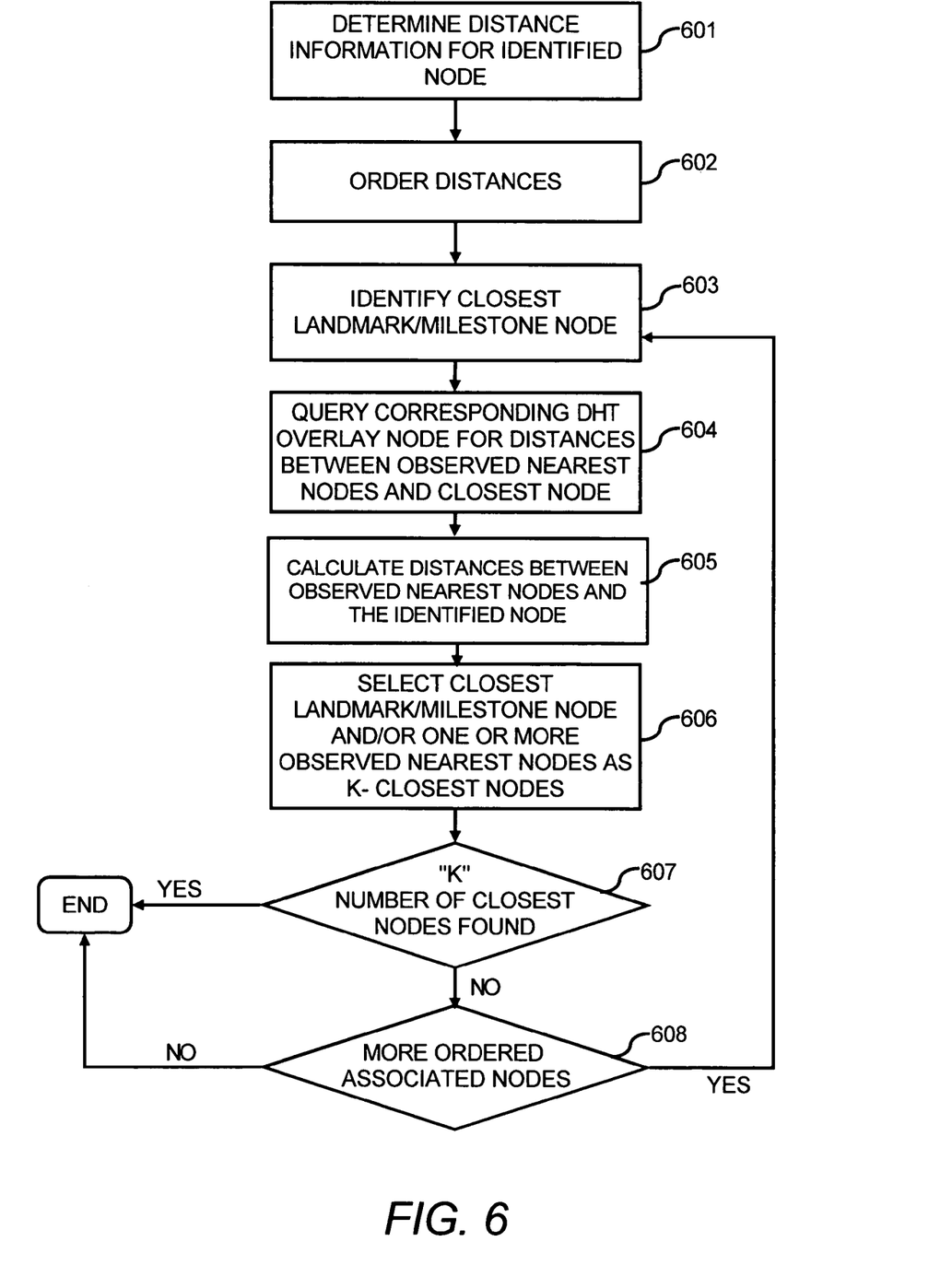
FIG. 6 illustrates a flowchart of a method for determining k-closest nodes, according to an embodiment.

FIG. 6 illustrates a method 600, according to an embodiment, for determining k-closest nodes. The distance information for nodes is stored in overlay nodes in the DHT overlay network, such as described in the method 500. The method 600 is described with respect to FIGS. 1-3 by way of example and not limitation.

At step 601, distance information for a node, referred to the identified node, is determined. Distance information may be determined such as described with respect to step 501 in the method 500 described above. In FIG. 3, distance information for the client node C1 is determined by measuring distances to landmark nodes, including L1 and L10, and milestone nodes, including M5, M6, M12 and M22.

At step 602, the determined distances are ordered. For example, a landmark vector including the determined distances is created. The distances in the landmark vector are ordered from shortest to longest. Each distance is associated with a landmark node or milestone node. For example, as described with respect to FIG. 3, the ordered landmark vector may be as follows: [d(C1,M5), d(C1,M6), d(C1,M12), d(C1,L1), . . . d(C1,M22), d(C1,L10)]. A shortest distance is associated with the milestone node M5; the next shortest distance is associated with M6, etc.

At step 603, an associated node is identified consecutively based on the order. For example, if the ordered landmark vector is [d(C1,M5), d(C1,M6), d(C1,M12), d(C1,L1), . . . d(C1,M22), d(C1,L10)], then M5 is the identified associated node. M5 is also referred to as the closest node. If step 503 is repeated, the next, consecutive, associated, closest node identified based on the order is M6, and then M12, and then L1, and so on.

At step 604 a corresponding DHT overlay node is queried to retrieve the observed nearest nodes for the closest node identified at step 603. For example, if the associated node is M5, the ID for M5 is hashed to identify the corresponding overlay node storing distance information for M5. A query for the observed nearest nodes to M5 is sent to the corresponding overlay node. The corresponding overlay node determines the closest nodes to M5 based on distances stored for M5. This may be a predetermined number of closest nodes to M5. The observed nearest nodes to M5 are transmitted to the client node C1 shown in FIG. 3.

At step 605, distances are calculated between the identified node and the observed nearest nodes from distances retrieved from the corresponding DHT overlay node and the measured distance to the closest node. For example, C1 shown in FIG. 3 previously measured a distance to M5. C1 calculates distances to the observed nearest nodes using the distance to M5. For example, one calculated distance is d(C1,M5)+d(M5 to first observed nearest node to M5). Another calculated distance is d(C1,M5)+d(M5 to second observed nearest node to M5), etc.

At step 606, k-closest nodes are selected from the closest node and/or one or more of the observed nearest nodes for the closest node based on the calculated distances. k-closest nodes includes a "k" number of nodes closest to the identified node. "k" may be predetermined. For example, M5 may be one of the k-closest nodes to C1. One or more of the observed nearest nodes to M5 may be included in the k-closest nodes to C1 based on their calculated distances. A threshold may be used to determine whether a node is a k-closest to node. For example, if the distance to M5 is less than the threshold, then M5 is a k-closest node.

At step 607, a determination is made as to whether the "k" number of closest nodes have been found. If not, at step 608, a determination is made as to whether there are any more associated nodes for the ordered distances determined at step 602. For example, the ordered landmark vector is [d(C1,M5), d(C1,M6), d(C1,M12), d(C1,L1), . . . d(C1,M22), d(C1,L10)]. Steps 603-607 have been performed for the associated node M5. At step 608, a determination is made that more associated nodes exist because M6 is the next associated node. Then, for the associated node M6, steps 603-607 are repeated. After the associated node L10, the method 600 is terminated at step 608, if the method 600 had not been terminated earlier based on a determination at step 607. The steps 607 may be performed simultaneously or in a different order. For example, step 608 may be performed before step 607.

The k-closest nodes may be determined only for nodes that provide a requested service or content. For example, if C1 requests a particular transcoding service, then at step 604, the DHT overlay network may only return distances for nodes that provide a requested service or content. Then, C1 may select one of the k-closest nodes providing a requested service or content, and send a message to the selected node requesting the service or content. The node receiving the message may then provide the requested content or service for the node C1.

Figure 7:
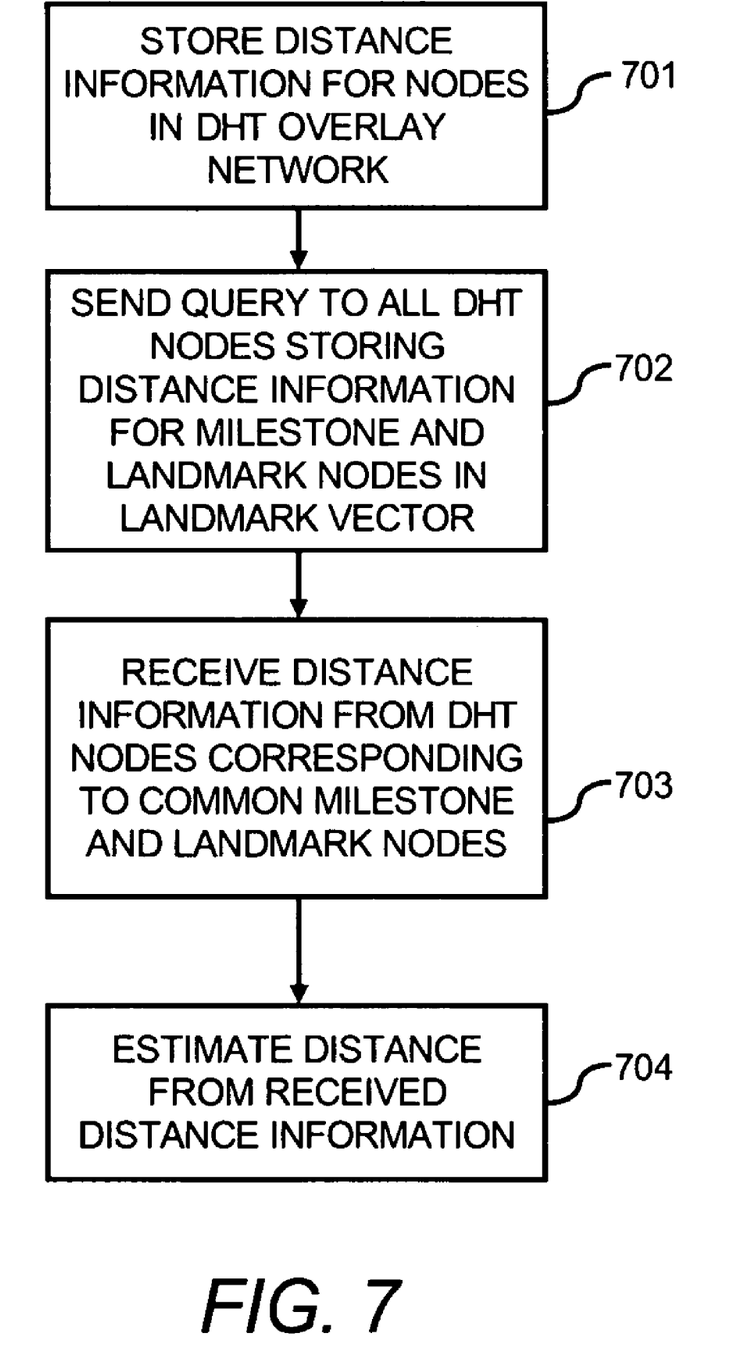
FIG. 7 illustrates a flowchart of a method for estimating distance between two nodes, according to an embodiment.

FIG. 7 illustrates a method 700, according to an embodiment, for estimating distance between nodes. The distance information for nodes is stored in overlay nodes in the DHT overlay network, such as described in the method 500. The method 700 is described with respect to FIGS. 1-4 by way of example and not limitation.

At step 701, distance information for two nodes are determined and stored in a DHT overlay network, such as described with respect to steps 501 and 502 in the method 500 described above. For example, in FIG. 4, distance information for the client nodes C1 and C2 are determined by measuring distances to landmark nodes L1- L10, and milestone nodes, including M5, M6, M12 and M22 for C1 and M11 and M15 for C2. The milestone and landmark nodes in the landmark vectors for C1 and C2 are each hashed to identify the DHT node for storing the corresponding distance.

At step 702, one of the two nodes sends a query for a distance between the two nodes to all the DHT nodes storing the distances for the milestone nodes and landmark nodes in the landmark vector for the one node. For example, C1 in FIG. 4 sends a query for the distance between C1 and C2 to all the DHT nodes storing the distances for C1's landmark vector. This includes the DHT nodes storing the distances for d(C1, M5), d(C1,M6), d(C1,M12), d(C1,L1), . . . d(C1,M22), d(C1, L10).

At step 703, the node receives distance information for determining a distance between C1 and C2, d(C1,C2), from all the DHT nodes storing distances for common milestone and landmark nodes in the landmark vectors for C1 and C2. The common milestone and landmark nodes for C1 and C2 include M22 and all the landmark nodes. For example, the DHT node storing distances for the milestone node M22 shown in FIG. 4 stores d(C1, M22) and d(C2, M22). That DHT node, in response to the query at step 702, sends distance information for determining d(C1,C2) to C1. Each DHT node storing distances for common milestone and landmark nodes in the landmark vectors for C1 and C2 sends distance information for determining d(C1,C2) to C1.

At step 704, the node determines an estimation of d(C1,C2) from one of the received distance information. For example, C1 either receives d(C1, M22) and d(C2, M22) from the DHT node storing distances for M22, or receives a final sum of d(C1, M22)+d(C2, M22) from the DHT node. C1 similarly receives distance information for d(C1, L1) and d(C2, L1) and d(C1, L10) and d(C2, L10) from the DHT nodes storing distances for L1 and L10. C1 selects the smallest d(C1,C2) as the estimated distance between C1 and C2. For example, the smallest of d(C1, M22)+d(C2, M22), d(C1, L1)+d(C2, L1) and d(C1, L10)+d(C2, L10) is selected as the estimation of d(C1,C2).

Figure 8:
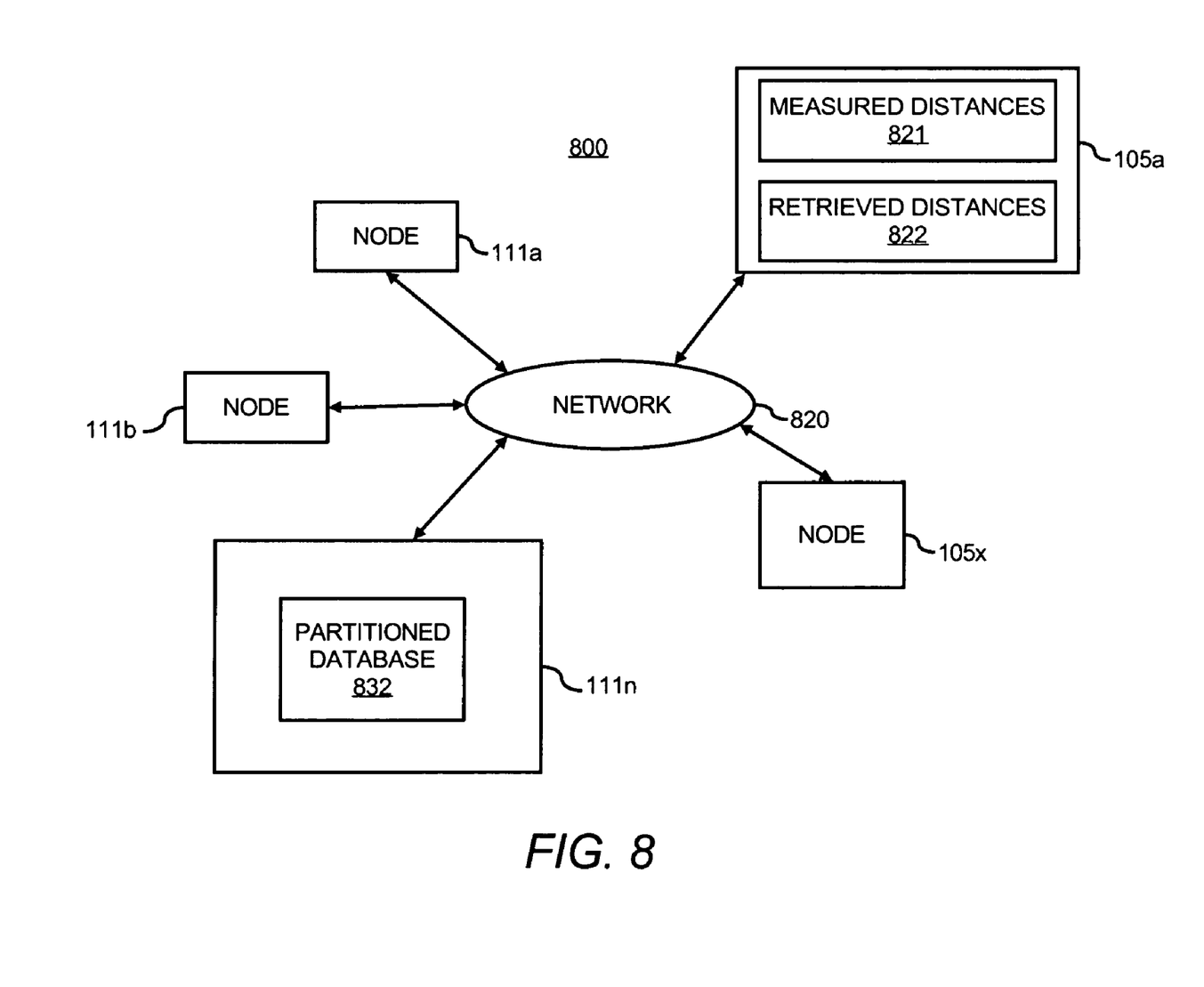
FIG. 8 illustrates a peer-to-peer system, according to an embodiment.

FIG. 8 illustrates a peer-to-peer (P2P) network 800 that may be used as the underlying physical network for the DHT overlay network 110 shown in FIG. 1. The nodes 105 and the overlay nodes 111 may be included in the P2P network 800. P2P networks are commonly used as the underlying physical network for DHT overlay networks.

The P2P network 800 includes a plurality of nodes, such as overlay nodes 111a, 111b and 111n and nodes 105a and 105x. The nodes 111a, 111b and 111n and the nodes 105a and 105x exchange information among themselves and with other network nodes over a network 820, which may include network infrastructure. One or more of the nodes perform functions of a peer in a P2P system, such as routing, data search and retrieval, data placement, etc. The nodes 111a, 111b and 111n may be further operable to operate as overlay nodes in a DHT overlay network.

The overlay nodes may store a portion of the partitioned database of distance information. For example, the overlay node 111n is shown as storing a portion of the partitioned database 832. If the overlay node 111n stores distance information for the milestone node M1 shown in FIG. 2, then distances between nodes and M1, such as d(S1,M1), are stored in the partitioned database 832. The partitioned database 832 may also indicate the service or content provided by S1.

The nodes 105 may store measured distances and distances retrieved from the DHT overlay network. For example, the node 105a is shown as storing measured distances 821 and retrieved distances 822. If the node 105a is C1, then the measured distances 821 may include [d(C1,M5), d(C1,M6), d(C1,M12), d(C1,L1), . . . d(C1,M22), d(C1,L10)]. The retrieved distances 822 may include distances for observed nearest nodes to associated nodes and services or content provided by nodes.

Figure 9:
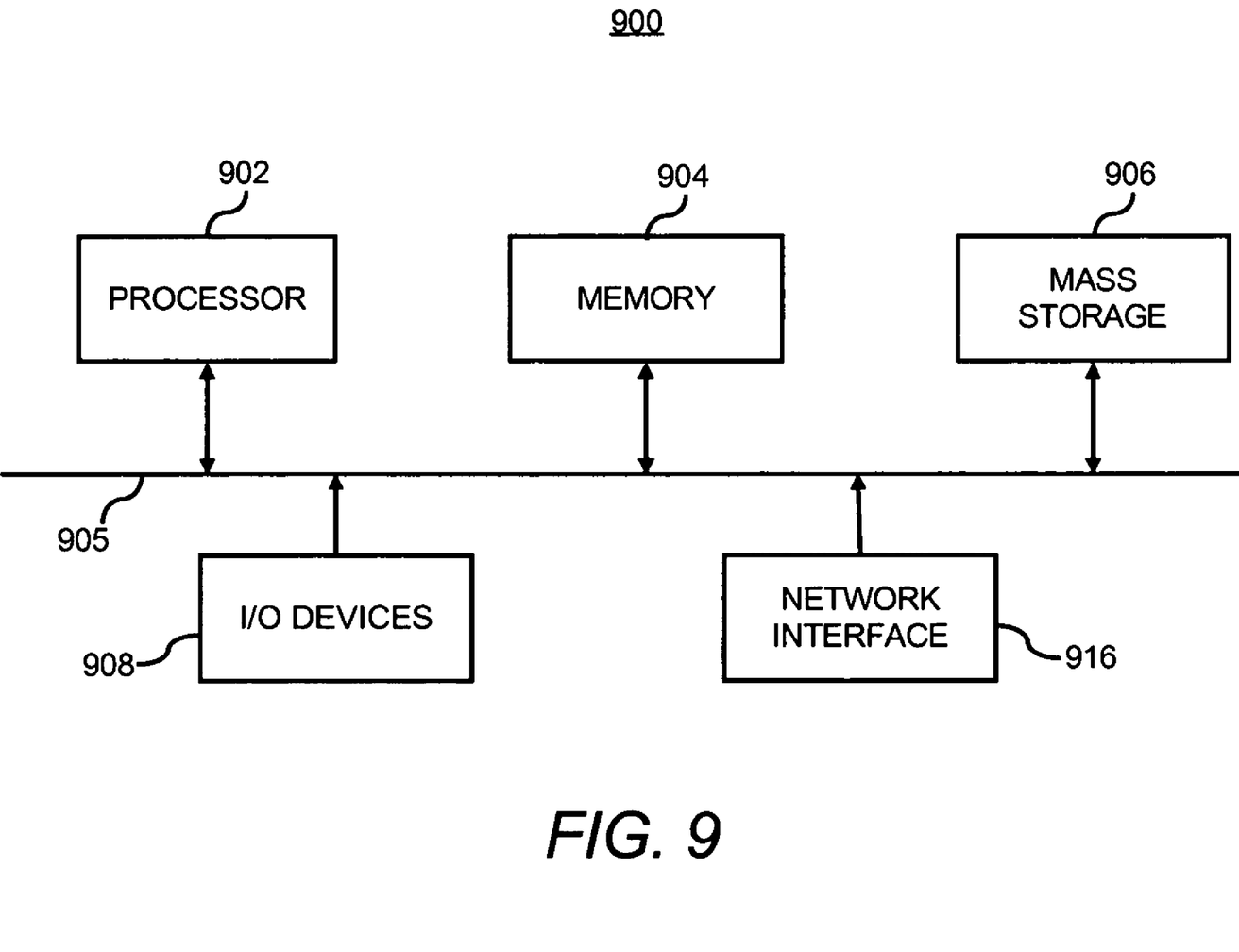
FIG. 9 illustrates a computer system that may operate as a node in the peer-to-peer system shown in FIG. 8, according to an embodiment.

FIG. 9 illustrates an exemplary block diagram of a computer system 900 that may be used as a node, such as one of the nodes 105 or 111 shown in FIG. 1. The computer system 900 includes one or more processors, such as processor 902, providing an execution platform for executing software.

Commands and data from the processor 902 are communicated over a communication bus 905. The computer system 900 also includes a main memory 904, such as a Random Access Memory (RAM), where software may be resident during runtime, and a secondary memory 906. The secondary memory 906 includes, for example, a hard disk drive and/or a removable storage drive, representing a floppy diskette drive, a magnetic tape drive, a compact disk drive, etc., or a non-volatile memory where a copy of the software may be stored. The secondary memory 906 may also include ROM (read only memory), EPROM (erasable, programmable ROM), EEPROM (electrically erasable, programmable ROM). In addition to software for routing and other steps described herein, routing tables, capacities for overlay paths, available bandwidths for overlay paths, and other data may be stored in the main memory 904 and/or the secondary memory 906.

A user interfaces with the computer system 900 with one or more I/O devices 907, such as a keyboard, a mouse, a stylus, display, and the like. A network interface 916 is provided for communicating with other nodes in the network 100.

One or more of the steps of the methods 400-600 and other steps described herein may be implemented as software embedded on a computer readable medium, such as the memory 904 and/or 906, and executed on the computer system 900, for example, by the processor 902. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the scope of the claimed embodiments.

What is claimed is:

1. A method of determining k-closest nodes from an identified node in a network, wherein distances for nodes in the network are stored in overlay nodes in a distributed hash table (DHT) overlay network, the method comprising:
    determining distances between the identified node and landmark nodes in the network;
    determining distances between the identified node and milestone nodes, wherein the milestone nodes are on network paths between the identified node and the landmark nodes;
    identifying a closest milestone or landmark node associated with a shortest of the measured distances from the landmark nodes and the milestone nodes to the identified node;
    querying a corresponding DHT overlay node that stores distances for the closest milestone or landmark node, and obtaining distances between observed nearest nodes and the closest milestone or landmark node from the corresponding DHT overlay node, wherein the observed nearest nodes are observed nearest nodes for the closest milestone or landmark node;
    calculating distances between the identified node and the observed nearest nodes based on distances received from the corresponding DHT overlay node and the measured distance between the closest milestone or landmark node and the identified node; and selecting k-closest nodes from the identified node from at least one of the closest milestone or landmark node and one or more of the observed nearest nodes based on the calculated distances.

2. The method of claim 1, wherein selecting k-closest nodes comprises:
determining a top k-closest nodes or k-closest nodes that are less than a threshold distance.

3. The method of claim 1, further comprising:
ordering the distances between the identified node and the landmark and milestone nodes from shortest to longest distances; and
identifying the closest milestone or landmark node associated with a shortest of the measured distances comprises identifying the closest milestone or landmark node associated with the shortest distance from the ordered distances.

4. The method of claim 3, for each of the ordered distances between the identified node and the landmark and milestone nodes starting from the shortest distance and proceeding to the longest distance, repeating steps of:
identifying the closest milestone or landmark node associated with the respective distance;
querying the corresponding DHT overlay node that stores distances for the closest milestone or landmark node, and obtaining distances between observed nearest nodes and the closest milestone or landmark node from the corresponding DHT overlay node, wherein the observed nearest nodes are observed nearest nodes for the closest milestone or landmark node;
calculating distances between the identified node and the observed nearest nodes from distances received from the corresponding DHT overlay node and the measured distance to the identified node; and
selecting an observed nearest node, landmark node or milestone node as a k-closest node if a "k" number of closest nodes have not been identified and the distance to the observed nearest node, landmark node or milestone node is less than a threshold.

5. The method of claim 1, wherein for each milestone node and each landmark node, a corresponding overlay node stores all measured distances between the milestone node or the landmark node and other nodes in the network.

6. The method of claim 5, wherein querying a corresponding DHT overlay node comprises:
identifying the corresponding overlay node storing distances for the closest milestone or landmark node; and
querying the corresponding overlay node for the distances between the observed nearest nodes and the identified node.

7. The method of claim 1, wherein determining distances comprises:
measuring distances between the identified node and the landmark nodes or the milestone nodes.

8. The method of claim 7, further comprising:
for each measured distance between the identified node and the landmark nodes and the milestone nodes, storing the distance in an overlay node in the DHT overlay network corresponding to the landmark node or milestone node to which the distance was measured.

9. The method of claim 8, wherein storing each distance in the DHT overlay network comprises:
hashing an ID for the landmark node or milestone node to identify the overlay node for storing the measured distance.

10. The method of claim 1, wherein selecting k-closest nodes comprises:
selecting k-closest nodes providing a requested service from at least one of the closest milestone or landmark node and one or more of the observed nearest nodes based on the calculated distances.

11. The method of claim 10, further comprising:
ordering the distances between the identified node and the landmark and milestone nodes from shortest to longest distances;
for each of the ordered distances between the identified node and the landmark and milestone nodes starting from the next to shortest distance and proceeding to longest distances, repeating steps of:
identifying the milestone or landmark node associated with the respective distance;
querying the corresponding DHT overlay node for distances between observed nearest nodes to the milestone or landmark node and the identified node, wherein the observed nearest nodes are observed nearest nodes for the closest milestone or landmark node;
calculating distances from the identified node to the observed nearest nodes from the distances received from the corresponding DHT overlay node and the measured distance to the identified node; and
selecting an observed nearest node, landmark node or milestone node as a k-closest node if a "k" number of closest nodes have not been identified and the distance to the observed nearest node, landmark node or milestone node is less than a threshold and the observed nearest node, landmark node or milestone node provides the requested service.

12. The method of claim 1, wherein determining the distances comprises:
transmitting a probe packet to each of the landmark nodes;
receiving probe packets from the landmark nodes and probe packets from the milestone nodes; and
determining latencies between the identified node and the landmark nodes and the milestone nodes from the probe packets received from the landmark nodes and the milestone nodes.

13. The method of claim 1, wherein distances are based on a network metric comprised of one of latency, loss rate, and bandwidth.

14. The method of claim 2, wherein identifying a closest milestone or landmark node comprises identifying the milestone and landmark nodes less than the threshold distance to the identified node.

15. A computer system configured to connect to a peer-to-peer network, where the peer-to-peer network includes a distributed hash table (DHT) overlay network storing distances for nodes in the network, the computer system comprising:
storage storing measured distances between the computer system and landmark nodes and milestone nodes in the network, wherein the milestone nodes are on network paths between the computer system and the landmark nodes; for each of the landmark nodes and milestone nodes, and
a processor configured to, starting from a closest landmark node or milestone node and proceeding to a farthest landmark node or milestone node, query a corresponding DHT overlay node that stores distances for the closest milestone or landmark node, and obtain distances between observed nearest nodes and the closest milestone or landmark node from the corresponding DHT overlay node, wherein the observed nearest nodes are observed nearest nodes for the closest milestone or landmark node;

the processor configured to, calculate distances between the computer system and the observed nearest nodes from distances received from the corresponding DHT overlay node and the measured distance to the landmark node or milestone node; and the processor configured to, select k-closest nodes from the computer system from at least one of the closest landmark node or milestone node and one or more of the observed nearest nodes based on the calculated distances.

16. The computer system of claim 15, wherein for each milestone node and each landmark node, a corresponding overlay node stores all measured distances between the milestone node or the landmark node and other nodes in the network, and the processor is configured to hash an ID for the landmark node or the milestone node for which distances are being calculated to identify the corresponding overlay node in the DHT overlay network storing distances for the observed nearest nodes.

17. The computer system of claim 15, wherein the processor is configured to determine k-closest nodes operable to provide a requested service based on the calculated distances and information about services provided by each node retrieved from the DHT overlay network.

18. A non-transitory computer readable storage device storing instructions executable by a processor to perform the following:

determining distances between the identified node and landmark nodes in the network;

determining distances between the identified node and milestone nodes, wherein the milestone nodes are on network paths between the identified node and the landmark nodes;

identifying a closest milestone or landmark node associated with a shortest of the measured distances from the landmark nodes and the milestone nodes;

querying a corresponding DHT overlay node that stores distances for the closest milestone or landmark node, and obtaining distances between observed nearest nodes and the closest milestone or landmark node from the corresponding DHT overlay node, wherein the observed nearest nodes are observed nearest nodes for the closest milestone or landmark node;

calculating distances between the identified node and the observed nearest nodes based on distances received from the corresponding DHT overlay node and the measured distance between the closest milestone or landmark node and the identified node; and selecting k-closest nodes from the identified node from at least one of the closest milestone or landmark node and one or more of the observed nearest nodes based on the calculated distances.

19. The non-transitory computer readable storage device of claim 18, wherein selecting k-closest nodes comprises:

determining a top k-closest nodes or k-closest nodes that are less than a threshold distance.

20. The non-transitory computer readable storage device of claim 18, wherein the processor further performs:

ordering the distances between the identified node and the landmark and milestone nodes from shortest to longest distances; and identifying the closest milestone or landmark node associated with a shortest of the measured distances comprises identifying the closest milestone or landmark node associated with the shortest distance from the ordered distances.

21. The non-transitory computer readable storage device of claim 19, wherein for each of the ordered distances between the identified node and the landmark and milestone nodes starting from the shortest distance and proceeding to the longest distance, repeating steps of:

identifying the closest milestone or landmark node associated with the respective distance;

querying the corresponding DHT overlay node that stores distances for the closest milestone or landmark node, and obtaining distances between observed nearest nodes and the closest milestone or landmark node from the corresponding DHT overlay node, wherein the observed nearest nodes are observed nearest nodes for the closest milestone or landmark node;

calculating distances between the identified node and the observed nearest nodes from distances received from the corresponding DHT overlay node and the measured distance to the identified node; and selecting an observed nearest node, landmark node or milestone node as a k-closest node if a "k" number of closest nodes have not been identified and the distance to the observed nearest node, landmark node or milestone node is less than a threshold.

22. The non-transitory computer readable storage device of claim 18, wherein for each milestone node and each landmark node, a corresponding overlay node stores all measured distances between the milestone node or the landmark node and other nodes in the network and querying the DHT overlay network for distances between observed nearest nodes to the closest milestone or landmark node and the identified node comprises:

identifying the corresponding overlay node storing distances for the closest milestone or landmark node; and querying the corresponding overlay node for the distances between the observed nearest nodes and the identified node.

23. A method of estimating a distance between two nodes in a network, wherein distances for nodes in the network are stored in overlay nodes in a distributed hash table (DHT) overlay network, the method comprising:

sending a query for the distance between the two nodes to a set of corresponding DHT overlay nodes storing the distances for milestone nodes and landmark nodes in a landmark vector for a first node of the two nodes, wherein the milestone nodes are on network paths between each of the two nodes and the landmark nodes;

in response to the query, receiving distance information from the DHT overlay nodes in the set storing distances for milestone and landmark nodes common to landmark vectors for the two nodes; and estimating the distance between the two nodes based on the received distance information.

24. The method of claim 23, wherein estimating the distance between the two nodes based on the received distance information comprises:

for distance information received from each of the DHT overlay nodes in the set storing distances for the milestone and landmark nodes common to landmark vectors for the two nodes, determining a sum of a distance from the first of two nodes to the common landmark or milestone node and a distance from the second of the two nodes to the common landmark or milestone node; and selecting a smallest of the sums as the estimation of the distance between the two nodes.

25. The method of claim 23, further comprising:

for each respective node of the two nodes in the network, measuring a distance between a landmark node or a milestone node and the respective one of the two nodes in the network, and hashing an ID for the landmark node or milestone node to identify a corresponding DHT overlay node for storing the measured distance.

* * * * *